(12) United States Patent
Schreiber

(10) Patent No.: US 9,828,860 B2
(45) Date of Patent: Nov. 28, 2017

(54) COMPRESSOR BLADE OF A GAS TURBINE AS WELL AS METHOD FOR MANUFACTURING SAID BLADE

(71) Applicant: Rolls-Royce Deutschland Ltd & Co KG, Blankenfelde-Mahlow (DE)

(72) Inventor: Karl Schreiber, Am Mellensee (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 619 days.

(21) Appl. No.: 13/953,944

(22) Filed: Jul. 30, 2013

(65) Prior Publication Data

US 2014/0030106 A1    Jan. 30, 2014

(30) Foreign Application Priority Data

Jul. 30, 2012   (DE) .................. 10 2012 015 135

(51) Int. Cl.
*F01D 5/28* (2006.01)
*F04D 29/32* (2006.01)
*F01D 5/14* (2006.01)

(52) U.S. Cl.
CPC .......... *F01D 5/282* (2013.01); *F04D 29/324* (2013.01); *F01D 5/147* (2013.01); *F05D 2220/36* (2013.01); *F05D 2230/232* (2013.01); *F05D 2240/303* (2013.01); *Y02T 50/673* (2013.01); *Y10T 156/10* (2015.01)

(58) Field of Classification Search
CPC . F01D 5/282; F01D 5/286; F01D 5/28; F04D 29/289; F04D 29/324; F04D 29/388
USPC .......................... 416/224, 229 R, 229 A, 234
See application file for complete search history.

(56) References Cited

U.S. PATENT DOCUMENTS

| 4,738,594 A | * | 4/1988 | Sato ..................... F04D 29/388 416/213 A |
| 5,165,859 A | * | 11/1992 | Monroe ................ F04D 29/388 244/134 D |
| 5,908,522 A | * | 6/1999 | Lofstrom .............. B64C 11/205 156/94 |
| 7,156,622 B2 | | 1/2007 | Schreiber |
| 8,251,664 B2 | | 8/2012 | Schreiber |

(Continued)

FOREIGN PATENT DOCUMENTS

| DE | 4411679 C1 | 12/1994 |
| DE | 10307610 | 9/2004 |

(Continued)

OTHER PUBLICATIONS

European Search Report dated Mar. 31, 2014 from counterpart App No. 13003788.0.
German Search Report dated Apr. 26, 2013 from counterpart application.

*Primary Examiner* — Dwayne J White
*Assistant Examiner* — Su Htay
(74) *Attorney, Agent, or Firm* — Shuttleworth & Ingersoll, PLC; Timothy Klima

(57) ABSTRACT

A compressor blade of a gas turbine includes an airfoil made of a fiber-reinforced plastic and a leading-edge element connected to said airfoil. The leading-edge element includes two partial elements, which are fabricated as separate elements and connected to one another, with the leading-edge element being connected to the airfoil essentially using the clamping effect of the two partial elements.

6 Claims, 3 Drawing Sheets

(56) References Cited

U.S. PATENT DOCUMENTS

Figure 1:
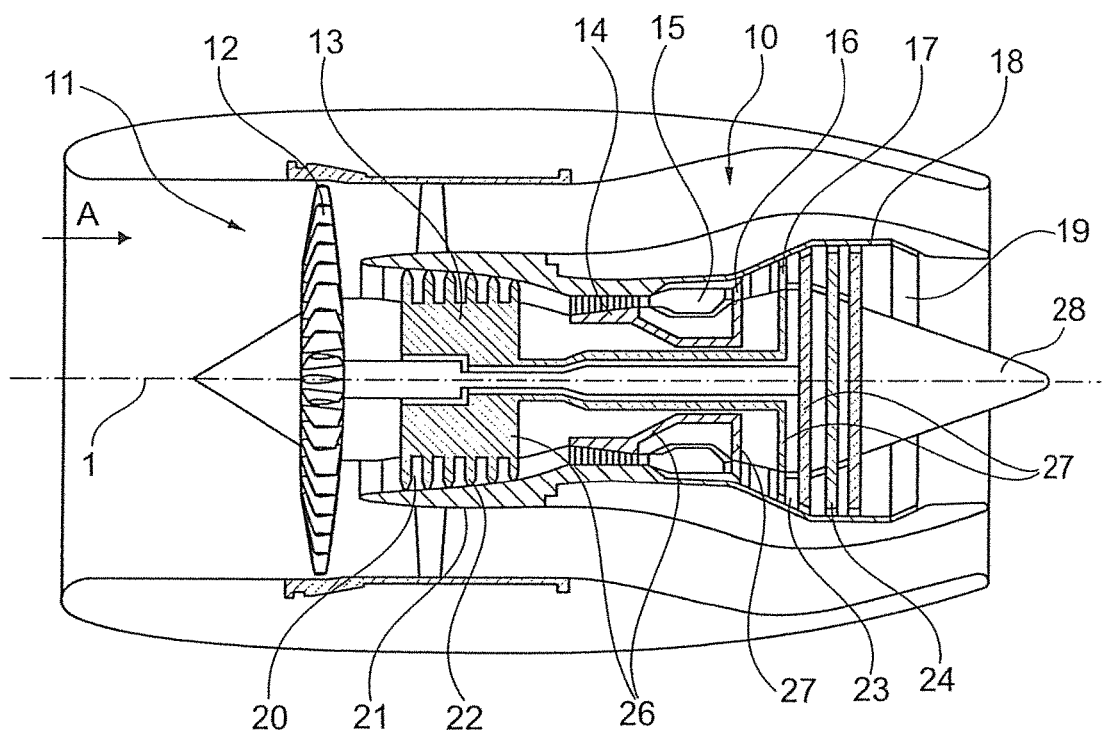

| | | | |
|---|---|---|---|
| 2004/0184921 A1* | 9/2004 | Schreiber | B23P 15/04 416/229 R |
| 2007/0065291 A1 | 3/2007 | Karafillis | |
| 2008/0075593 A1 | 3/2008 | Read et al. | |
| 2008/0152506 A1* | 6/2008 | Schreiber | F01D 5/282 416/229 R |
| 2008/0152858 A1 | 6/2008 | Schreiber | |
| 2009/0074586 A1 | 3/2009 | Le Hong et al. | |
| 2012/0020802 A1* | 1/2012 | Schreiber | F01D 5/286 416/224 |
| 2012/0082556 A1 | 4/2012 | Macchia et al. | |
| 2012/0082559 A1 | 4/2012 | Guglielmin et al. | |
| 2012/0114494 A1* | 5/2012 | Ford | B22F 3/15 416/229 R |
| 2012/0328446 A1* | 12/2012 | Hunziker | F01D 5/282 416/224 |

FOREIGN PATENT DOCUMENTS

| | | |
|---|---|---|
| DE | 102006061915 | 7/2008 |
| EP | 0808990 A1 | 11/1997 |
| EP | 1450006 | 8/2004 |
| EP | 1939402 | 7/2008 |
| EP | 1939403 | 7/2008 |
| FR | 2953430 | 6/2011 |
| GB | 2288441 A1 | 10/1995 |
| GB | 2482247 | 1/2012 |

* cited by examiner

COMPRESSOR BLADE OF A GAS TURBINE AS WELL AS METHOD FOR MANUFACTURING SAID BLADE

This application claims priority to German Patent Application 10 2012 015 135.7 filed Jul. 30, 2012, the entirety of which is incorporated by reference herein.

This invention relates to a compressor blade of a fan of an aircraft gas turbine having an airfoil made of a fiber-reinforced plastic, and a leading-edge element connected to said airfoil as well as to a method for manufacturing a compressor blade of this type. The invention also relates to stationary gas turbines.

It is known from the state of the art to cast or forge compressor blades for turbines from metallic materials. Furthermore, the state of the art shows compressor blades made of fiber-reinforced plastics, for example carbon fiber-reinforced plastics.

For blades made of fiber-reinforced plastics, it is necessary to apply a metallic leading edge which usually is made of a titanium alloy. With the known methods, the leading edge, which can also be designed as a leading-edge element, is adhesively connected to the airfoil made of fiber-reinforced plastic. Here the leading edge or the leading-edge element encloses both a part of the pressure side and a part of the suction side of the compressor blade to protect the latter from mechanical damage. Such mechanical damage can occur for example due to a bird strike, ingress of foreign bodies or erosion.

The metallic leading-edge element is critical in compressor blades of this type, as regards service life, strength, applicability and manufacturing costs. In fans of aircraft gas turbines, heavily twisted or crescent-shaped airfoils of the fan are often used. These airfoils have a very complex geometry, in particular in respect of the leading edge or inflow edge. This complex geometry results from both aerodynamic optimizations and reasons of manufacturability. To that extent, it can prove very difficult to manufacture suitable leading-edge elements and to connect them to the airfoils.

There is a further requirement in respect of the connection between the leading-edge element and the airfoil made of fiber-reinforced plastic. Purely adhesive connections (bonds) between the supporting structure formed by the airfoil and the metallic leading-edge element are expensive and failure-prone with regard to their service life and manufacturability.

The object underlying the present invention is to provide a compressor blade of a fan of the type specified at the beginning as well as a method for manufacturing said blade, which, while being simply designed and easily and cost-effectively producible, avoid the disadvantages of the state of the art and ensure in particular a long service life of the compressor blade.

It is a particular object to provide solution to the above problems by a combination of the features described herein. Further advantageous embodiments will be apparent from the present description.

In accordance with the invention, it is thus provided that the airfoil itself is made of a fiber-reinforced plastic. This can for example be a carbon fiber-reinforced plastic processed using standard manufacturing methods. In accordance with the invention, the leading-edge element is designed in the form of two partial elements which can be made separately, for example by means of a shaping method or forging method. This makes it possible to achieve very complex geometries for the two partial elements of the leading-edge element. It has proven to be particularly advantageous here, when the two partial elements are designed to have no undercuts. This simplifies their manufacture, since simpler tools can be used.

The two partial elements are then connected in accordance with the invention to form a single leading-edge element. This is preferably done by means of a welded connection, preferably using a laser welding method. It is however also possible to connect the two partial elements to one another non-positively or positively by means of other methods, for example by using bolts, rivets or screws.

It is provided in accordance with the invention that the two partial elements are first placed onto the airfoil and fixed or fastened to it before they are connected. This can be achieved by means of an adhesive film, for example.

In accordance with the invention, the two partial elements are dimensioned and designed such that at their free ends they apply a clamping force or pretensioning force to the airfoil. This ensures that fixing, for example by means of the adhesive film, is dependably achieved and that the two end areas of the partial elements are in firm contact with the airfoil.

In accordance with the invention, it is particularly advantageous when the weld has the greatest possible distance from the non-metallic airfoil. This minimizes the thermal stress during the welding process, also due to the poor thermal conductivity of the titanium alloys generally used, so that the material of the airfoil is not affected by the welding process.

It has proven particularly advantageous in accordance with the invention when the two partial elements are connected by means of a laser welding method. This can be conducted with high quality and low energy input per unit length.

By welding the two partial elements in the pretensioned state, it is ensured that the pretensioning force to be applied to the airfoil is maintained in the completed compressor blade.

Since the two partial elements are made in accordance with the invention from the same material, welding can be performed to a high quality, since the material properties are identical.

The two partial elements thus form in cross-section the two sides of the leading-edge element which enclose the airfoil on both the pressure side and the suction side in the area of the leading edge. This results in effective protection of the compressor blade from stresses occurring from, for example, bird strike or impacting particles such as sand grains or stones.

The method in accordance with the invention can be applied inexpensively even to very complex shapes of compressor blades. Such compressor blades can for example have a length of 1.3 m. The area of the two partial elements extending in the flow direction can for example be 100 mm. The thickness of the areas contacting the airfoil can for example be up to a minimum amount of 0.2 mm.

A further substantial advantage of the solution in accordance with the invention is that the partial elements can be manufactured with a high production tolerance, since the elastic spring pretension for applying the clamping force or pretensioning force can compensate for minor production tolerances.

By providing an inflow-edge element between the two partial elements, it is possible to provide a self-sharpening inflow edge. An inflow-edge element of this type can for example be made of high-manganese steel or Stellite.

In developments of the invention, it is also possible to provide in addition a positive connection between the two partial elements and the airfoil, for example by a groove provided in the airfoil and in which engages a partial area of at least one of the partial elements.

The solution in accordance with the invention furthermore permits in the event of repair replacement of the leading-edge element by the weld being parted and, after completion of the repair, re-applied using the same or refurbished metallic components. A further advantage is that the adhesive gaps necessary for bonding the leading-edge element to the airfoil can be provided in a simple manner.

The present invention is preferably used for a tan of an aircraft gas turbine.

The present invention is described in the following in light of the accompanying drawing, showing an exemplary embodiment. In the drawing, FIG. 1 shows a schematic representation of a gas-turbine engine in accordance with the present invention, FIG. 2 shows a partial perspective view, partly sectional, of an exemplary embodiment of a compressor blade in accordance with the present invention.

Figure 2:
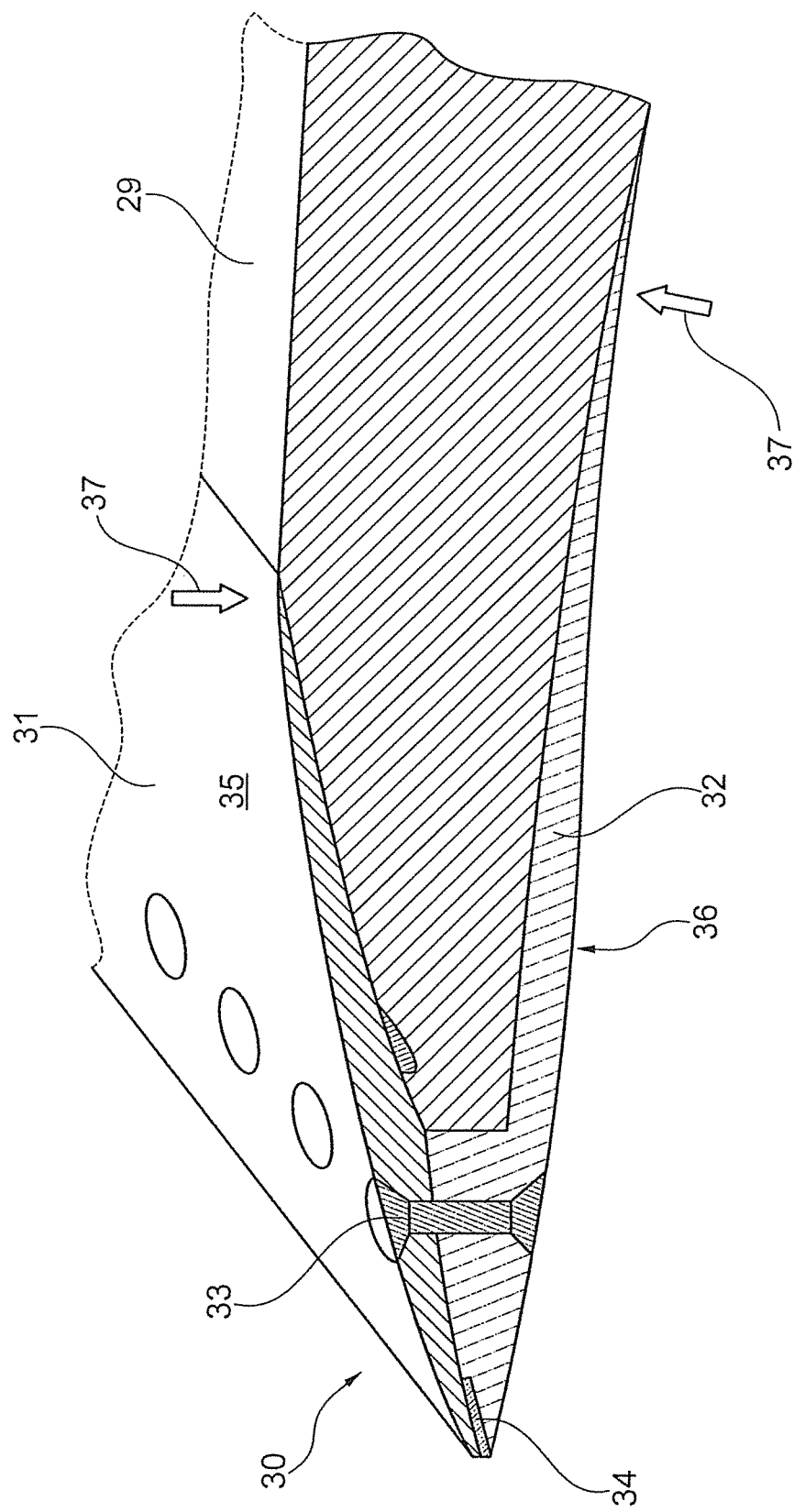
Figure 3:
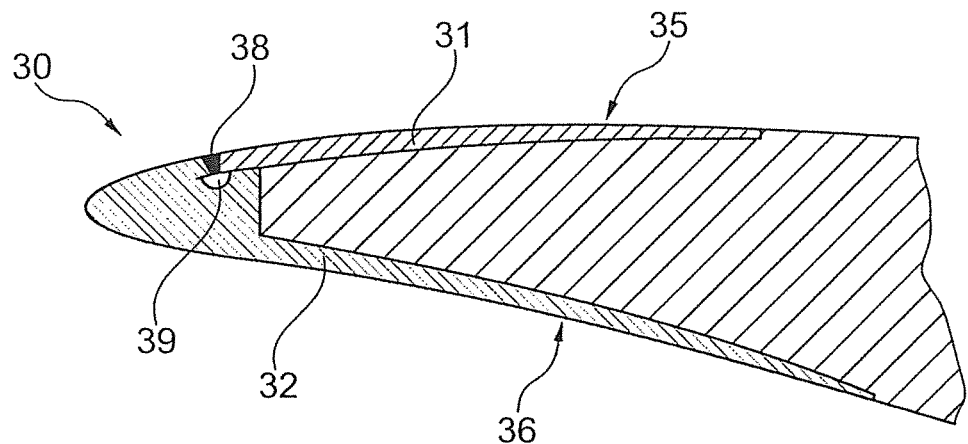
Figure 4:
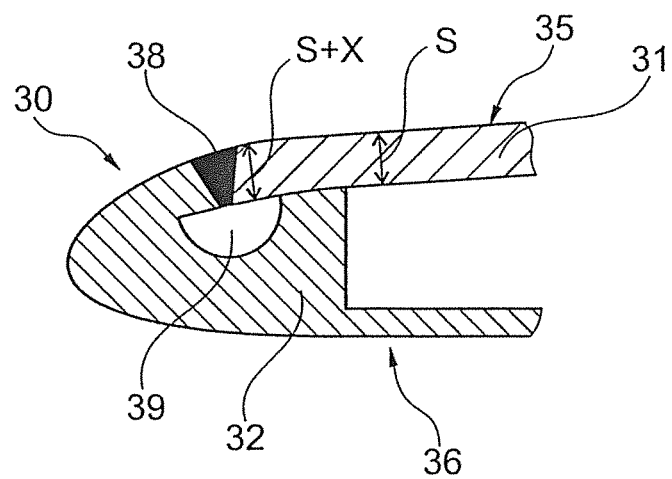

FIG. 3 shows a view, by analogy with FIG. 2, of a further exemplary embodiment, and FIG. 4 shows a detail representation as per FIG. 3.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows in a partial perspective view a compressor blade in accordance with the invention. It includes an airfoil 29, which is made of a fiber-reinforced plastic. On the inflow side of the airfoil 29, a leading-edge element 30 is arranged which is formed from a first partial element 31 and a second partial element 32. The first partial element 31 is essentially arranged on the suction side 35, while the second partial element 32 is essentially provided on the pressure side 36. The two partial elements 31 and 32 are connected in the area of the inflow side by means of connecting elements 33 in the exemplary embodiment shown in FIG. 2. These connecting elements can be designed in the form of bolts, rivets or screws. In the contact area of the partial elements 31 and 32, an inflow-edge element 34 can be provided which ensures profiling or sharpness of the leading edge.

The two downstream-positioned sides of the first partial element 31 and the second partial element 32 each apply a clamping force or pretensioning force 37 to the airfoil 29.

FIGS. 3 and 4 show an alternative exemplary embodiment in which the two partial elements 31 and 32 are connected by means of a weld 38. To ensure good weld penetration, a channel-like cavity 39 can additionally be provided. It can furthermore prove advantageous, as shown in FIG. 4, to increase the material thickness of the first partial element 31 in the area of the weld 38, as shown by the double arrow "s+x" in comparison with the material thickness according to the double arrow "s".

LIST OF REFERENCE NUMERALS

1 Engine axis
10 Gas-turbine engine/core engine
11 Air inlet
12 Fan
13 intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Airfoil
30 Leading-edge element
31 First partial element
32 Second partial element
33 Connecting element (bolt, rivet, screw)
34 Inflow-edge element
35 Suction side
36 Pressure side
37 Clamping force/pretensioning force
38 Weld
39 Cavity

What is claimed is:

1. A method for manufacturing a compressor blade of a gas turbine,
   providing an airfoil made of fiber-reinforced plastic,
   providing a first partial element and a second partial element made of a metallic material,
   bonding one of the first and second partial elements to a pressure side of the airfoil and the other of the first and second partial elements to the suction side of the airfoil such that the first and second partial elements have a closed upstream portion and an open downstream portion to enclose a leading edge portion of the airfoil while leaving a downstream portion of the fiber-reinforced plastic of the airfoil exposed, and
   subsequently, connecting the first and second partial elements to one another in a manner that creates a pretensioning in the first and second partial elements with respect to the airfoil to apply a clamping force to a portion of the airfoil positioned between the two partial elements in a stationary state of the compressor blade.

2. The method in accordance with claim 1, and further comprising connecting the partial elements to the airfoil only after application on the airfoil.

3. The method in accordance with claim 1, and further comprising fabricating the partial elements with an accurate fit for applying a pretensioning contact force to the airfoil.

4. The method in accordance with claim 1, and further comprising welding the partial elements together while pretensioned, when mounted on the airfoil.

5. The method in accordance with claim 4, and further comprising laser welding the partial elements together.

6. The method in accordance with claim 1, and further comprising providing an inflow-edge element between the partial elements that extends at least over part of a length of the compressor blade.

* * * * *